United States Patent [19]
McNeil et al.

[11] Patent Number: 5,020,069
[45] Date of Patent: May 28, 1991

[54] PLATINUM CATALYST FOR FORMING CARBON DIOXIDE

[75] Inventors: John A. McNeil, Los Angeles; David B. Cohn, Torrance, both of Calif.

[73] Assignee: Hughes Aircraft Company, Los Angeles, Calif.

[21] Appl. No.: 452,141

[22] Filed: Dec. 18, 1989

[51] Int. Cl.$^5$ .......................... H01S 3/22; B01J 23/44
[52] U.S. Cl. ........................ 372/59; 502/339
[58] Field of Search ..................... 372/59; 502/339

[56] References Cited

U.S. PATENT DOCUMENTS

| | | | |
|---|---|---|---|
| 2,079,840 | 5/1937 | Byrkit, Jr. | 502/339 |
| 3,607,084 | 9/1971 | Mackey et al. | 502/339 |
| 4,000,089 | 12/1976 | Senda | 502/339 |
| 4,547,886 | 10/1985 | Kaminski et al. | 372/59 |
| 4,829,035 | 5/1989 | Upchurch et al. | 372/59 |
| 4,837,770 | 6/1989 | Koop | 372/59 |
| 4,868,841 | 9/1989 | Affleck et al. | 372/59 |
| 4,897,848 | 1/1990 | Macken | 372/59 |
| 4,905,249 | 2/1990 | Turner | 372/59 |

FOREIGN PATENT DOCUMENTS

| | | | |
|---|---|---|---|
| 1256398 | 12/1977 | United Kingdom | 372/59 |
| 2028571 | 3/1980 | United Kingdom | |
| 2083944 | 3/1982 | United Kingdom | |

OTHER PUBLICATIONS

Artamanov et al., "Fast-flow pulsed $CO_2$ closed-cycle laser with a carbon dioxide regeneration unit", *Sov. J. Quantum Electron;* vol. 11, No. 5, May 1981, pp. 679–681.

Sorem et al., "Catalytic Converters for Closed-Cycle Operation of Isotopic $CO_2$ TEA Lasers", *Rev. Sci: Instrum.*, vol. 52, No. 8, Aug. 1981, pp. 1193–1196.

*Primary Examiner*—James W. Davie
*Attorney, Agent, or Firm*—Mary E. Lachman; W. K. Denson-Low

[57] ABSTRACT

A catalyst for reacting carbon monoxide and oxygen to form carbon dioxide, comprising platinum black deposited on a platinum wire, and having a moderate activation temperature of about 150°–300° C. A catalytic apparatus includes this catalyst, means for directly heating the catalyst, and electronic means for controlling and monitoring the heating of the catalyst. Carbon dioxide laser systems incorporating this catalytic apparatus are also disclosed.

10 Claims, 1 Drawing Sheet

PLATINUM CATALYST FOR FORMING CARBON DIOXIDE

BACKGROUND OF THE INVENTION

1. Field of the Invention

The present invention relates generally to a catalyst for converting carbon monoxide and oxygen into carbon dioxide. More particularly, the present invention relates to a catalyst comprising platinum black deposited on platinum wire which is effective for converting carbon monoxide and oxygen to carbon dioxide at a moderate temperature within the range of about 150 to 300° C.

2. Description of Related Art

In a carbon dioxide ($CO_2$) laser system, carbon dioxide, which is the active lasing medium, is contained in a sealed laser cavity which also houses a pair of electrodes for applying an electric discharge to the carbon dioxide. When a electric discharge is applied, laser emission is produced by the $CO_2$. However, the electric discharge also dissociates the $CO_2$ into carbon monoxide (CO) and atomic oxygen (0), as indicated by Equation (1) below.

$$CO_2 \rightarrow CO + O \quad (1)$$

The atomic oxygen so formed then reacts with itself to form molecular oxygen ($O_2$) as shown in Equation (2).

$$O + O \rightarrow O_2 \quad (2)$$

The net reaction is the conversion of carbon dioxide to carbon monoxide and molecular oxygen as shown in Equation (3).

$$CO_2 \rightarrow CO + \tfrac{1}{2} O_2 \quad (3)$$

The oxygen formed by this process causes a rapid loss in laser power and other erratic discharge behavior including arcing. Thus, it is desirable to remove this oxygen. To accomplish this result, it has been the practice in the art to use a catalyst to promote the reaction of the CO and $O_2$ to re-form the $CO_2$ starting material. One such catalyst comprises an electrically heated platinum wire which operates at 1000° C., as disclosed, for example, by D. S. Stark and M. R. Harris, in the publication "Platinum-Catalysed Recombination of CO and $O_2$ in Sealed $CO_2$ TEA Laser Gases," *J. Phys. E: Sci Instrum*, Vol. 11, 1978, pages 316-319. However, the use of this high temperature is undesirable because it requires increased power input and generates heat, which may lead to distortion of the laser cavity or optical bench. Another catalyst which has been used for this purpose is Hopcalite, as disclosed, for example, by R. B. Gibson et al, in the publication "Sealed Multiatmosphere $CO_2$ TEA Laser: Seed-gas Compatible System Using Unheated Oxide Catalyst," *Appl. Phys. Lett.*, Vol. 32, No. 11, 1978, pages 726-727. Hopcalite is a mixture of 60 percent magnesium oxide and 40 percent cuprous oxide that is provided in powder or granular form, and is available from Mine Safety Appliances Company of Evans City, Pa. Unfortunately, very small particulates from the granules become dispersed throughout the laser cavity and cover the optical elements, thus degrading the laser performance. In addition, Hopcalite has been found to rapidly deactivate when stored in a laser gas mixture or in the presence of water. Other catalysts which have been used for this purpose comprise mixtures of noble metal catalysts on ceramic substrates, as disclosed for example in U.S. Pat. No. 4,639,432. However, such catalysts are sensitive to contamination or lack the required activity.

Consequently, there exists in the field of carbon dioxide lasers the need for a catalyst for removing oxygen and, in particular, for reacting the oxygen and carbon monoxide by-products to form carbon dioxide, which is effective at moderate temperatures and is not easily contaminated. This catalyst would also be desirable for other applications where carbon monoxide and oxygen are combined to form carbon dioxide or where oxygen must be removed in the presence of carbon monoxide.

SUMMARY OF THE INVENTION

The general purpose of this invention is to provide an improved, moderate-temperature catalyst for reacting carbon monoxide and oxygen to form carbon dioxide. This catalyst possesses all of the advantages of the prior art catalysts discussed above while overcoming their above-noted significant disadvantages.

The above general purpose of the present invention is accomplished by providing a catalyst comprising platinum black deposited on a platinum wire wherein the catalyst is directly heated and has an activation temperature of about 150-300° C.

In accordance with an alternative embodiment of the present invention, there is provided a catalytic apparatus comprising the above-noted catalyst, means for passing an electric current through the catalyst to directly heat the catalyst, and electronic means for controlling the application of electric current to the catalyst wherein the catalyst is part of the means for both generating and monitoring the temperature of the catalyst.

In another alternative embodiment of the present invention, the above-described catalytic apparatus is incorporated into a carbon dioxide laser system.

The above-discussed and many other features and attendant advantages of the present invention will become better understood by reference to the following detailed description when considered in conjunction with the accompanying drawings.

DESCRIPTION OF THE PREFERRED EMBODIMENTS

Figure 1:
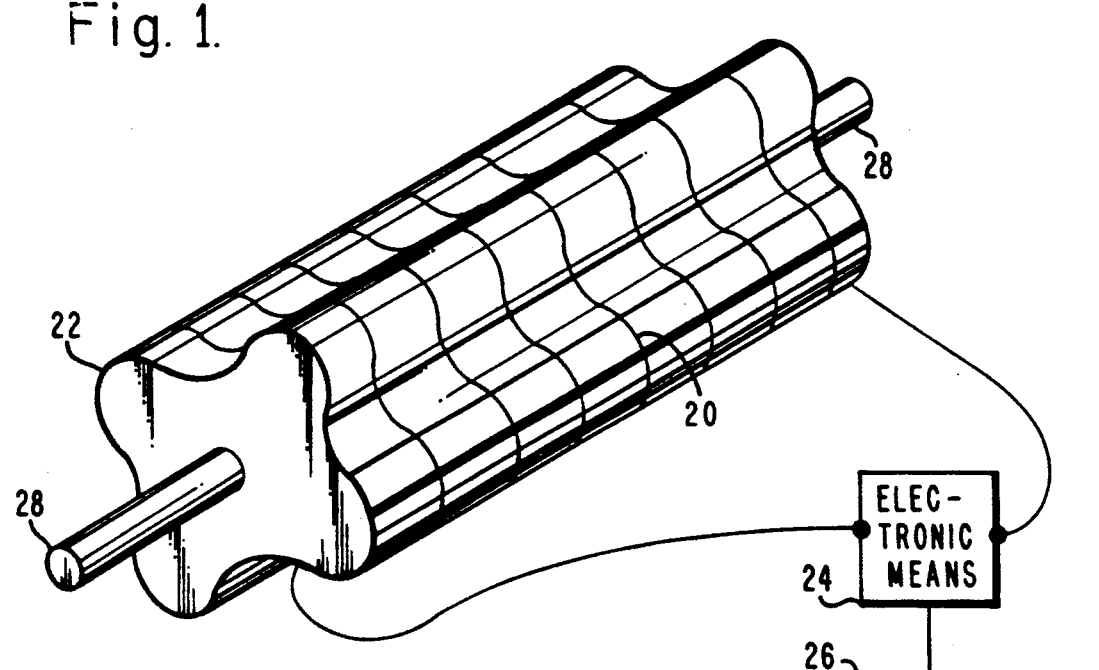
FIG. 1 shows a catalyst in accordance with the present invention which is wound on a support.

The catalyst in accordance with the present invention comprises platinum black deposited on a platinum wire. The platinum black, when raised to the appropriate activation temperature, i.e., 150-300° C., performs the desired catalytic action, and the platinum wire performs both as the mechanical substrate for the platinum black and as the means to maintain and monitor the appropriate temperature of the catalyst.

Platinum black is a finely divided, high surface area form of metallic platinum which is typically derived from reduction of a solution of platinum salt with zinc or magnesium. By itself, it is in the form of a black powder, is soluble in aqua regia, and has an apparent specific gravity of 15.8 to 17.6. Platinum black may be deposited on the platinum wire in accordance with the present invention by an electroplating process which is known in the art as platinization. Optionally, other known methods for depositing platinum black may be used. The use of platinum black on a platinum wire substrate has the advantage that good chemical and physical integrity is achieved. Since the coefficients of thermal expansion are well matched, there is minimal concern with the platinum black flaking off the substrate and contaminating the system in which the catalyst is used. In addition, there is no concern with the platinum black being contaminated by the substrate, as occurs in known catalysts using two or more chemically different materials. In order to maximize exposure of the present catalyst to the reacting gases, the catalyst is preferably wound on a support which is made of a material that has poor heat conduction, such as a ceramic material. For convenience, the platinum wire may be first wound onto the support and then platinized.

The present catalyst is heated to its activation temperature by passing an electric current from an external power source through the platinum wire. Since the platinum wire is resistive, it becomes heated when the current is applied, and transfers the heat to the platinum black. Thus, the present catalyst is internally heated and requires no external source of heat, as many known catalysts do. In addition, only the catalyst is heated in accordance with the present invention; whereas the gas surrounding the catalyst, which serves as the heat transfer medium, must be heated in the external, i.e., indirect, heating method of previously used catalysts. Thus, the direct heating of the present catalyst is more efficient and requires less power input than indirect heating methods previously used. Further, the present catalyst does not require the constant application of current. The platinum wire is heated to a predetermined temperature, which is the activation temperature for the catalyst and is within the range of about 150 to 300° C. Using known electronic monitor and control means, the resistance of the platinum wire is sensed and the temperature of the catalyst is monitored. When the temperature of the catalyst reaches the desired temperature, as determined by the required amount of catalytic activity, the application of current through the platinum wire is discontinued. The temperature of the catalyst is continually monitored and when it falls below a predetermined level, the current is applied again. Another advantage of the present invention is that the platinum catalyst serves as its own temperature monitor or regulator. Since the temperature of the resistively heated platinum wire depends on its resistance, if the resistance is determined, the temperature can also be determined. Thus, no external temperature monitor device is needed in the present invention.

The length of the catalyst used in accordance with the present invention is determined by the laser system in which it is used and the power requirements of that system. A longer length of catalyst provides more catalytic activity. However, the catalytic activity varies linearly with the length of the catalyst and exponentially with the temperature of the catalyst. A simple study can be made to determine the optimum catalyst length for the minimum power requirements.

FIG. 1 shows a preferred embodiment of the present invention comprising a platinum wire coated with platinum black 20 which is wound on a support 22. The platinum wire of the catalyst 20 is connected to electronic means 24 which monitors and controls the application of current from power source 26 to the catalyst 20, as previously described. The support 22 may optionally include mounting means 28 for ease in positioning the support in the desired location in the laser system. The undulating shape of support 22 shown in FIG. 1 is illustrative only and other shapes may be used.

Figure 2:
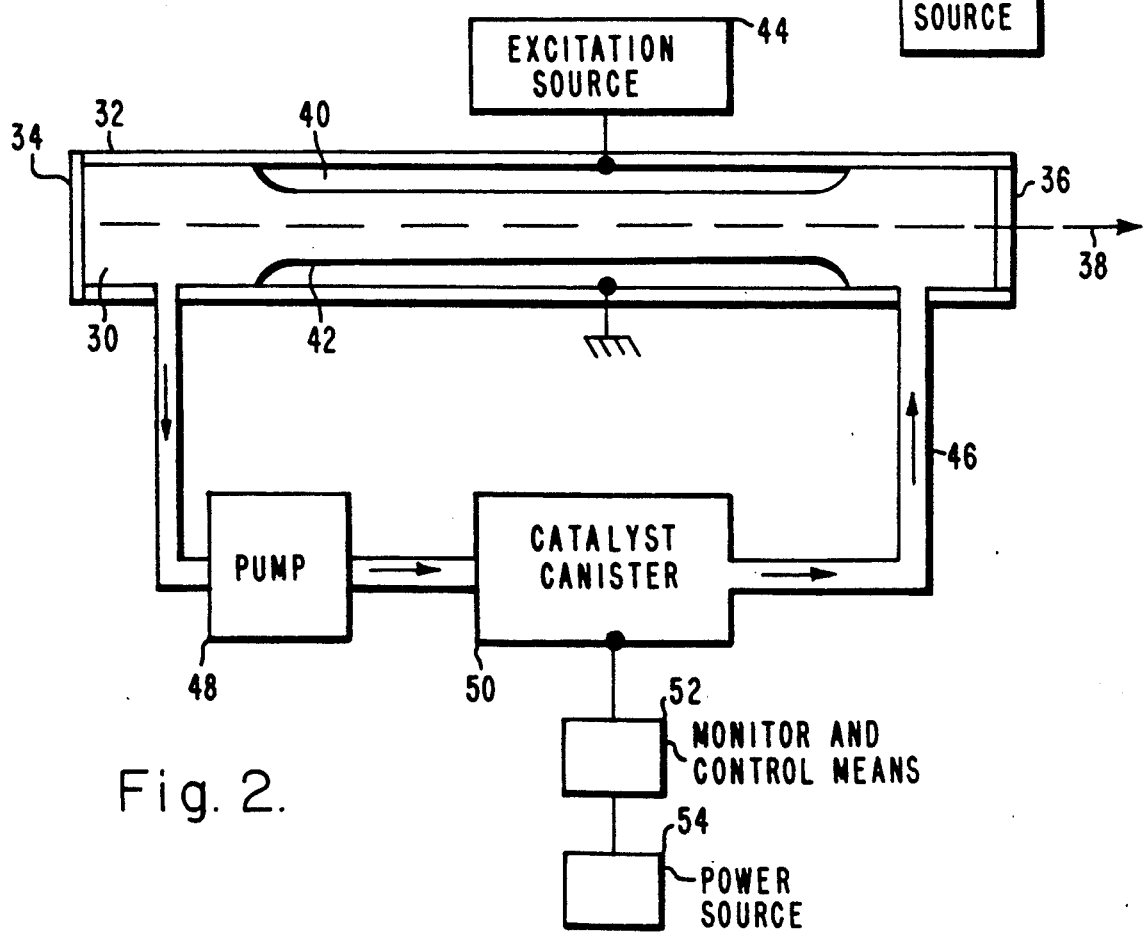
FIG. 2 shows a block diagram of a carbon dioxide laser system incorporating an alternative embodiment of the present invention in which the catalyst is contained in a canister external to the laser cavity.

In use, the catalyst of the present invention may be placed directly in the $CO_2$ laser cavity, and the power source 26 and electronic means 28 are located externally from the laser cavity. In a preferred embodiment, the catalyst of the present invention, as well as the power source and electronic means are all located external to the laser cavity, as shown in FIG. 2. The laser system shown in FIG. 2 comprises a laser resonator cavity 30 which is defined by outer cavity walls 32. At one end of the laser resonator cavity 30, there is a totally reflecting optical element 34, and at the opposite end of the cavity 30, there is a partially reflecting/partially transmitting optical element 36, through which a beam 38 of laser radiation is emitted. Electrodes 40 and 42 are located within cavity 30 and induce lasing of the carbon dioxide gas within cavity 30 when the electrodes are activated by excitation source 44. The excitation source 44 may provide a high voltage or RF energy, for example. The operation of $CO_2$ lasers is well known and will not be discussed in detail.

The apparatus of FIG. 2 further comprises a gas bypass system 46, which includes a gas pump 48 and a catalyst canister 50 for containing the present catalyst (not shown). Electronic monitor and control means 52 and power source 54 are connected to the catalyst in the same manner as shown in FIG. 1. In operation, pump 48 circulates the gas from cavity 30, which contains the carbon monoxide and oxygen by-products, to the catalyst canister 50. Within canister 50, the catalyst of the present invention produces the recombination of carbon monoxide and oxygen to form carbon dioxide and the latter is pumped back into cavity 30 by pump 48. The canister 50 serves as a gas flow restricting enclosure for the present catalyst and reduces the amount of catalyst cooling caused by gas flowing over the catalyst. Thus, less power input is required to heat the catalyst. In addition, in this embodiment, it is possible to treat only a portion of the laser exhaust gas, rather than the total gas in the laser cavity. The gas flow restrictor may have shapes other than the canister form shown in FIG. 2. The dimensions of the gas flow restrictors, such as length, diameter, and size of gas input and output means, may all be varied in order to obtain optimum catalytic efficiency.

Examples of practise of the present invention are as follows.

EXAMPLE 1

A catalyst and catalytic apparatus in accordance with the present invention as shown in FIG. 1 and comprising a platinum wire of one meter in length, coated with platinum black and wound on a ceramic support was placed in a carbon dioxide laser cavity and heated to its activation temperature, which was 300° C. At this temperature, the catalyst of the present invention produced substantially the same level of catalytic activity as an uncoated platinum wire of the same length which was heated to 1000° C. Thus, the present catalyst provides a significant reduction in the activation temperature of the catalyst compared to the prior art catalyst which results in a corresponding reduction in input power required for adequate catalytic activity, which otherwise would have to be supplied to and dissipated from the system. Approximately 60 watts of power was required in order to reach the 300° C. activation temperature of the present catalyst, which sustained the $CO_2$ laser for $10^6$ laser pulses.

EXAMPLE 2

A catalytic apparatus and $CO_2$ laser system in accordance with the present invention as shown in FIG. 2 was operated as previously described. The catalyst comprised a one-meter length of platinum wire having platinum black deposited thereon, wound on a ceramic support, and placed in a gas flow restricting canister external to the laser. By reducing the rate of gas flowing at the catalyst, the amount of cooling due to convection is reduced, thus enabling the activation temperature to be achieved with significantly less input power. Due to the advantages of this embodiment previously discussed, only 8 watts of power was required to heat the catalyst to its activation temperature of 300° C. Thus, this embodiment of the present invention produces even more substantial reduction in input power requirements than the embodiment discussed in Example 1.

In view of the previous discussion, it can be seen that the catalyst and catalytic apparatus in accordance with the present invention provide high catalytic activity at moderate temperatures, namely about 150-300° C., which significantly reduces the input power requirements, improves the efficiency of such catalytic systems, and avoids the previously discussed prior art thermal effects. In addition, the present catalyst is free from self-contamination or contamination of the laser system. The catalytic apparatus of the present invention has the added advantages of simplicity and reduced costs since the catalyst itself is the heat source and, further, serves as its own temperature sensor for temperature control.

While the present invention has been described with regard to its use in a carbon dioxide laser system, it is not intended to so limit the present invention. Rather, it is intended that the present catalyst and catalytic apparatus be used for the reaction of carbon monoxide and oxygen to form carbon dioxide in any application where moderate temperatures of about 150-300° C. are necessary or desirable.

Having thus described exemplary embodiments of the present invention, it should be noted by those skilled in the art that the within disclosures are exemplary only and that various other alternatives, adaptations, and modifications may be made within the scope of the present invention. Accordingly, the present invention is not limited to the specific embodiments as illustrated herein, but is only limited by the following claims.

What is claimed is:

1. In a platinum wire catalytic apparatus for catalyzing the reaction of carbon monoxide and oxygen to form carbon dioxide by directly heating said catalyst to an activation temperature of about 1000° C. wherein the improvement comprises a layer of platinum black deposited on the surface of said platinum wire to form a coating whereby said wire with said coating is directly heated to an activation temperature within the range of about 150 to 300° C.

2. A catalytic apparatus for reacting carbon monoxide and oxygen to form carbon dioxide at a temperature within the range of about 150 to 300° C., comprising:

(a) a catalyst comprising platinum black deposited on a platinum wire and having an activation temperature within the range of about 150 to 300° C.;
(b) means for passing an electric current through said catalyst to thereby directly heat said catalyst; and
(c) electronic means for controlling the application of said electric current to said catalyst, including means for monitoring the temperature of said catalyst, wherein said means for monitoring comprises said catalyst.

3. A catalytic apparatus as set forth in claim 2 further comprising a thermally insulative support wherein said platinum wire with said coating is carried on said support.

4. A catalytic apparatus as set forth on claim 2 further comprising means for restricting flow of gas around said catalyst.

5. A catalytic apparatus as set forth in claim 4 wherein said means for restricting flow of gas comprises a canister having a predetermined length, a predetermined diameter, and openings of predetermined position and size for said flow of gas.

6. A carbon dioxide laser system comprising: (a) a sealed cavity for containing said carbon dioxide; (b) means for exciting said carbon dioxide to produce laser radiation therefrom, whereby carbon monoxide and oxygen by-products are formed; (c) catalyst means located external to said cavity for converting said carbon monoxide and oxygen to carbon dioxide; and (d) means for connecting said catalyst means to said cavity for flowing gas between said cavity and said catalyst means, wherein the improvement comprises said catalyst means comprises a catalyst comprising a platinum wire having platinum black deposited thereon and having an activation temperature within the range of about 150 to 300° C., means for applying current to said catalyst to directly heat said catalyst, and electronic means for controlling the application of said current to said catalyst including means for monitoring the temperature of said catalyst wherein said catalyst comprises said means for monitoring.

7. A carbon dioxide laser system as set forth in claim 6 further comprising a thermally insulative support wherein said platinum wire with said platinum black is carried on said support.

8. A carbon dioxide laser system as set forth in claim 6 further comprising means for restricting flow of gas around said catalyst.

9. A carbon dioxide laser system comprising: (a) a sealed cavity for containing said carbon dioxide; (b) means for exciting said carbon dioxide to produce laser radiation therefrom, whereby carbon monoxide and oxygen by-products are formed; and (c) catalyst means located within said cavity for converting said carbon monoxide and oxygen to carbon dioxide, wherein the improvement comprises said catalyst means comprises a catalyst comprising a platinum wire having platinum black deposited thereon, and having an activation temperature within the range of about 150 to 300° C., means for applying current to said catalyst to directly heat said catalyst, and electronic means for controlling the application of said current to said catalyst including means for monitoring the temperature of said catalyst wherein said catalyst comprises said means for monitoring.

10. A carbon dioxide laser system as set forth in claim 9 further comprising a thermally insulative support wherein said platinum wire with said platinum black is carried on said support.

* * * * *